2 Sheets--Sheet 1.
J. E. REGISTER.
Drier.
No. 161,156.
Patented March 23, 1875.
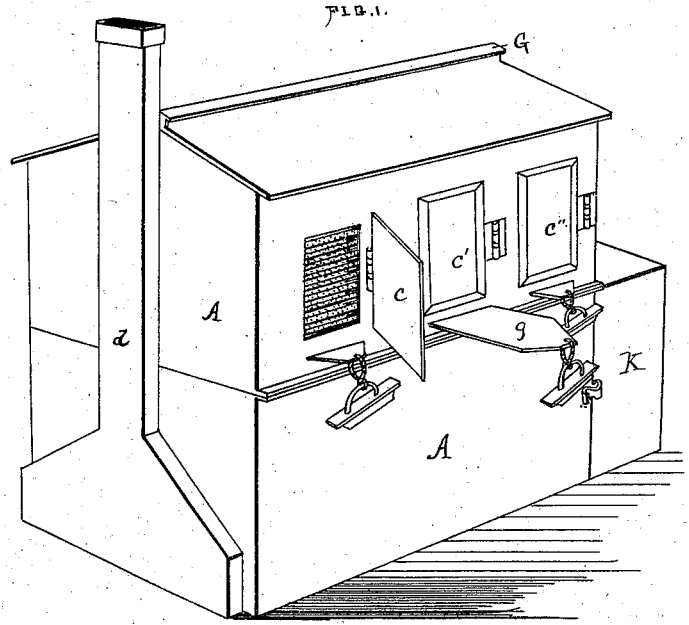
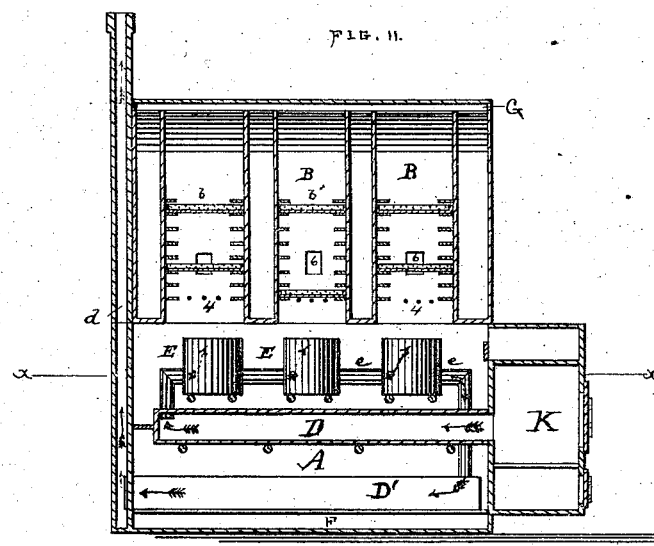
WITNESSES
F. B. Townsend.
Thill H. Moson
INVENTOR
John E. Register
per Atty
A. H. Evans & Co
THE GRAPHIC CO.PHOTO-LITH.39 & 41 PARK PLACE,N.Y.

2 Sheets--Sheet 2.
J. E. REGISTER.
Drier.
No. 161,156.
Patented March 23, 1875.
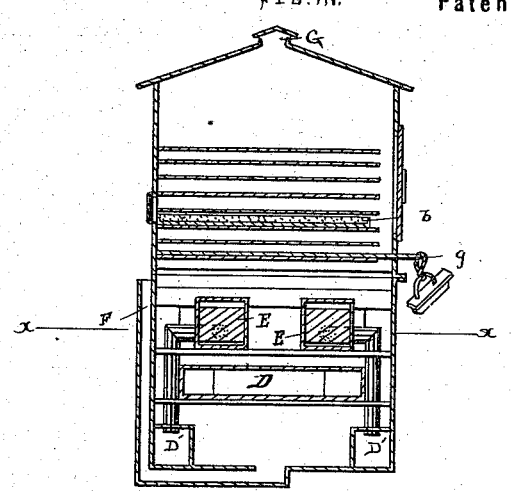
FIG. III.
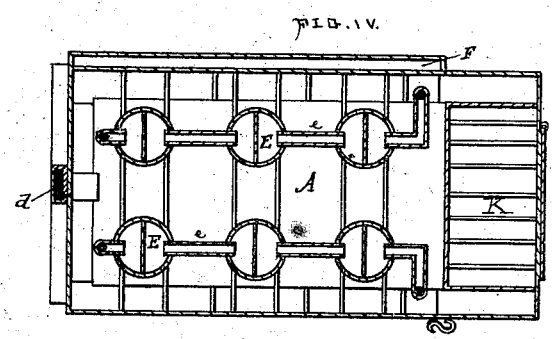
FIG. IV.
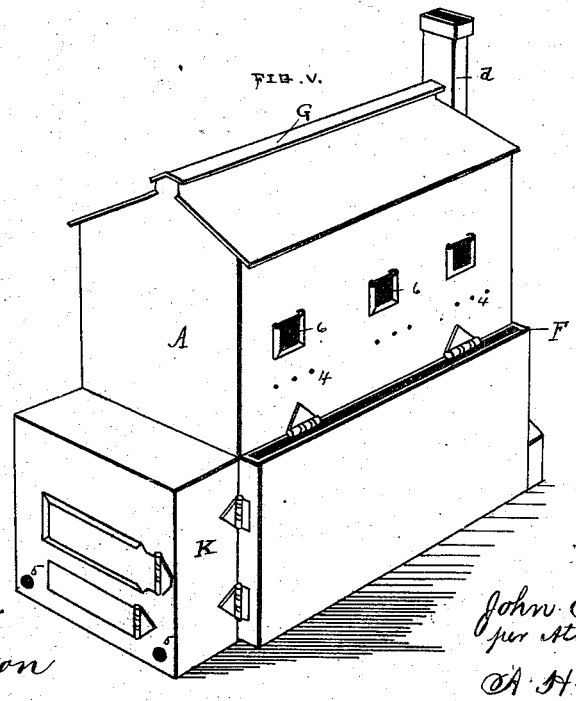
FIG. V.
WITNESSES.
F. B. Townsend.
Shell H Moson
INVENTOR
John E. Register
per Atty
A. H. Evans & Co.
THE GRAPHIC CO. PHOTO-LITH. 39 & 41 PARK PLACE, N.Y.

UNITED STATES PATENT OFFICE.

JOHN E. REGISTER, OF DOVER, DELAWARE, ASSIGNOR OF ONE-HALF HIS RIGHT TO THE DOVER FRUIT AND VEGETABLE PRESERVING COMPANY.

IMPROVEMENT IN DRIERS.

Specification forming part of Letters Patent No. 161,156, dated March 23, 1875; application filed February 23, 1875.

*To all whom it may concern:*

Be it known that I, JOHN E. REGISTER, of Dover, Delaware, have invented certain new and useful Improvements in Fruit, Vegetable, Meat, and Fish Driers; and I hereby declare the following to be a full, clear, and exact description thereof, reference being had to the accompanying drawings making a part of this specification, in which—

Figure 1 is a perspective view of my invention. Fig. 2 is a longitudinal section. Fig. 3 is a transverse vertical section. Fig. 4 is a horizontal section through the line $x\,x$. Fig. 5 is a perspective view of the rear of the drier.

The nature of my invention relates to that class of fruit, vegetable, meat, and fish driers wherein the articles to be dried or rendered anhydrous are subjected to an upward passage of heated currents of dry air through perforated trays; and it consists in the combination of devices hereinafter described and claimed.

In order to enable others skilled in the art to make and use my invention, I will proceed to describe the exact manner in which I have carried it out.

A represents a chamber or dry-house with the furnace K attached at one end. The upper part of this chamber is divided into sections or compartments B, each section being adapted to receive the trays $b\,b'$, on which is arranged the material to be dried, in a manner to be hereinafter described. The sections B have each its own door $c\,c'\,c''$, and its open bottom communicating with the lower portion of the chamber. A flat flue, D, leads from the furnace K through the lower portion of the chamber, and through the pipes $e$ and base-flues D' to the chimney $d$. E E are drums connected by the flues $e\,e$, through which the heat passes from the furnace to the base-flues D', and thence to the chimney, and by means of which the air is heated as it enters from the cold-air flue F down the rear and at the bottom of the chamber. The air thus heated passes up through the sections B containing the articles to be dried, and, more or less charged with moisture from the material to be dried, passes off through the ventilator G at the top of the chamber.

The sections B are so constructed and arranged as to enable the operator to concentrate the current of heated air in any one or more sections by sliding in the solid diaphragm $g$ at the bottom of the section not to be used. This diaphragm acts as a damper and cuts off from the section the heat, and thus causes it to be concentrated in the sections being used, and from which the dampers have been withdrawn. The trays $b\,b'$ are constructed of wire net-work, or may be made of sheet metal closely perforated, or any other similar material. The trays are placed one above the other in the sections, and on suitable cleats provided for the purpose. The articles to be dried are placed on these trays in alternate rows and open spaces, so as to admit of a thorough circulation of hot air through the trays, and through and between the layers of the article being dried, and then the trays are arranged above each other, so as to alternate the open spaces and the rows of material to be dried, which arrangement secures to the top tray and all the others in a section the benefit of free circulation of hot air, thus enabling me to use any number of trays desirable, and thus effect a great saving of time and expense in the drying of all kinds of fruits, vegetables, meat, and fish. The drums E E are partially divided, as shown in Fig. 2, in order to more completely utilize the heat in its passage from the furnace to the chimney.

The openings 5 are for the admission of cold air into the drying-chamber. The openings 4 in the rear of the chamber are for regulating the temperature, and may be closed if necessary. 6 are recesses closed with glass for holding thermometers, by which the heat in the several sections is regulated.

Having thus described my invention, what I claim as new, and desire to secure by Letters Patent, is—

The chamber A and furnace K in combination with the flat flue D, drums E E, connecting-flues $e\,e$, sections B, and trays $b\,b$, all constructed and arranged to operate substantially as and for the purpose set forth.

JOHN E. REGISTER. [L. S.]

Witnesses:
W. J. CLARKE,
J. M. CHAMBERS.